United States Patent
Onishi et al.

(10) Patent No.: US 10,997,889 B2
(45) Date of Patent: May 4, 2021

(54) DISPLAY CONTROL DEVICE, DISPLAY CONTROL METHOD, PROGRAM, AND DISPLAY SYSTEM

(71) Applicant: Komatsu Ltd., Tokyo (JP)

(72) Inventors: Yoshiyuki Onishi, Tokyo (JP); Masahiro Kurihara, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/605,269

(22) PCT Filed: Jun. 27, 2018

(86) PCT No.: PCT/JP2018/024361
§ 371 (c)(1),
(2) Date: Oct. 15, 2019

(87) PCT Pub. No.: WO2019/012992
PCT Pub. Date: Jan. 17, 2019

(65) Prior Publication Data
US 2020/0126464 A1   Apr. 23, 2020

(30) Foreign Application Priority Data
Jul. 14, 2017  (JP) .............................. JP2017-138418

(51) Int. Cl.
| G09G 5/00 | (2006.01) |
| G09G 3/20 | (2006.01) |
| G06T 19/00 | (2011.01) |
| G09G 5/377 | (2006.01) |
| G09G 5/38 | (2006.01) |

(52) U.S. Cl.
CPC ............... G09G 3/20 (2013.01); G06T 19/00 (2013.01); G09G 5/377 (2013.01); G09G 5/38 (2013.01)

(58) Field of Classification Search
CPC .. G09G 3/20; G09G 5/00; G09G 5/38; G09G 5/377; G02B 27/01; G02B 27/017; G02B 27/0179; G06T 19/00; H04N 7/18
See application file for complete search history.

(56) References Cited

U.S. PATENT DOCUMENTS 5,631,658 A * 5/1997 Gudat .................. A01B 79/005
                                                      342/357.31
6,191,732 B1 * 2/2001 Carlson .................. E02F 3/842
                                                      342/357.3

(Continued)

FOREIGN PATENT DOCUMENTS

JP   2013-009267 A   1/2013
JP   2016-102312 A   6/2016

(Continued)

*Primary Examiner* — Joe H Cheng
(74) *Attorney, Agent, or Firm* — Locke Lord LLP

(57) ABSTRACT

A position/pose acquisition unit acquires a position and a pose of a viewpoint in a real space. A site data disposition unit disposes site data which is three-dimensional data representing a shape of a construction site in a virtual space on the basis of the position and the pose of the viewpoint. A machine data disposition unit disposes machine data which is three-dimensional data representing a shape of a work machine at a position corresponding to the site data in the virtual space. A rendering unit renders the disposed machine data.

21 Claims, 11 Drawing Sheets

(56) References Cited

U.S. PATENT DOCUMENTS

| | | | |
|---|---|---|---|
| 6,928,384 B2* | 8/2005 | Kochi | G01C 15/00 |
| | | | 702/155 |
| 9,776,566 B2* | 10/2017 | Ishimoto | B60R 1/00 |
| 2004/0054667 A1* | 3/2004 | Kake | G06F 3/016 |
| 2004/0158355 A1* | 8/2004 | Holmqvist | G05D 1/0274 |
| | | | 700/245 |
| 2007/0214687 A1* | 9/2007 | Woon | G06T 17/30 |
| | | | 37/415 |
| 2015/0009329 A1* | 1/2015 | Ishimoto | B60R 11/04 |
| | | | 348/148 |
| 2015/0175071 A1* | 6/2015 | Ishimoto | H04N 7/18 |
| | | | 348/148 |
| 2015/0199847 A1* | 7/2015 | Johnson | G09G 5/377 |
| | | | 345/633 |
| 2016/0153802 A1* | 6/2016 | Sato | G09B 29/007 |
| | | | 701/526 |
| 2017/0120822 A1* | 5/2017 | Petzold | B60Q 1/00 |
| 2017/0175364 A1* | 6/2017 | Hasegawa | E02F 9/261 |
| 2018/0167588 A1* | 6/2018 | Izumikawa | E02F 3/40 |
| 2018/0230678 A1* | 8/2018 | Taira | G05D 1/0276 |
| 2019/0387219 A1* | 12/2019 | Kondo | G05D 1/0038 |

FOREIGN PATENT DOCUMENTS

| | | | | |
|---|---|---|---|---|
| WO | 2017/042873 A1 | 3/2017 | | |
| WO | WO-2019012992 A1 * | 1/2019 | | G09G 5/377 |

* cited by examiner

DISPLAY CONTROL DEVICE, DISPLAY CONTROL METHOD, PROGRAM, AND DISPLAY SYSTEM

This application is a national stage of PCT/JP2018/0234361, filed on Jun. 27, 2018 and claims priority to Japanese Application No. 2017-138418, filed on Jul. 14, 2017.

TECHNICAL FIELD

The present invention relates to a display control device, a display control method, a program, and a display system.

Priority is claimed on Japanese Patent Application No. 2017-138418, filed on Jul. 14, 2017, the content of which is incorporated herein by reference.

BACKGROUND ART

PTL 1 discloses a technique in which, in order to cause an operator of a work machine to recognize other workers who are working around the work machine, an image indicating the presence of a worker is combined with a marker portion drawn on a helmet worn by the worker in a captured image displayed on display means.

CITATION LIST

Patent Literature

[PTL 1] Japanese Unexamined Patent Application, First Publication No. 2013-9267

SUMMARY OF INVENTION

Technical Problem

For example, when a construction site is setup, there is a desire to check a disposition and an operation of a work machine not on a drawing but at the construction site. Through checking at the construction site, for example, it is possible to easily recognize the presence or absence of a space in which the work machine is operable at the construction site, or the number of iron plates to be placed on the construction site such that a crawler of the work machine does not damage the construction site due to traveling of the work machine. On the other hand, during setup, it is not easy to actually dispose and operate a work machine at a construction site.

Aspects of the present invention are directed to providing a display control device, a display control method, a program, and a display system, capable of easily checking an operation of a work machine at a construction site.

Solution to Problem

According to a first aspect of the present invention, there is provided a display control device including a position/pose acquisition unit that acquires a position and a pose of a viewpoint in a real space; a site data disposition unit that disposes site data which is three-dimensional data representing a shape of a construction site in a virtual space on the basis of the position and the pose of the viewpoint; a machine data disposition unit that disposes machine data which is three-dimensional data representing a shape of a work machine at a position corresponding to the site data in the virtual space; and a rendering unit that renders the disposed machine data.

Advantageous Effects of Invention

According to at least one of the aspects, the display control device enables a user to easily check an operation of a work machine at a construction site.

DESCRIPTION OF EMBODIMENTS

First Embodiment

In a first embodiment, an image of a work machine is displayed to be combined with an image of a construction site imaged by a portable terminal. Examples of the portable terminal may include a smart phone, a tablet terminal, and a digital camera. Consequently, a user can visually recognize how the work machine is disposed and is operated at the construction site. Examples of the work machine may include a hydraulic excavator performing excavation work and banking work, a bulldozer and a wheel loader performing excavation work and transport work, a road roller performing compaction work, a motor grader performing shaping work, and a dump truck performing transport work.

<<Hardware of Portable Terminal>>

Figure 1:
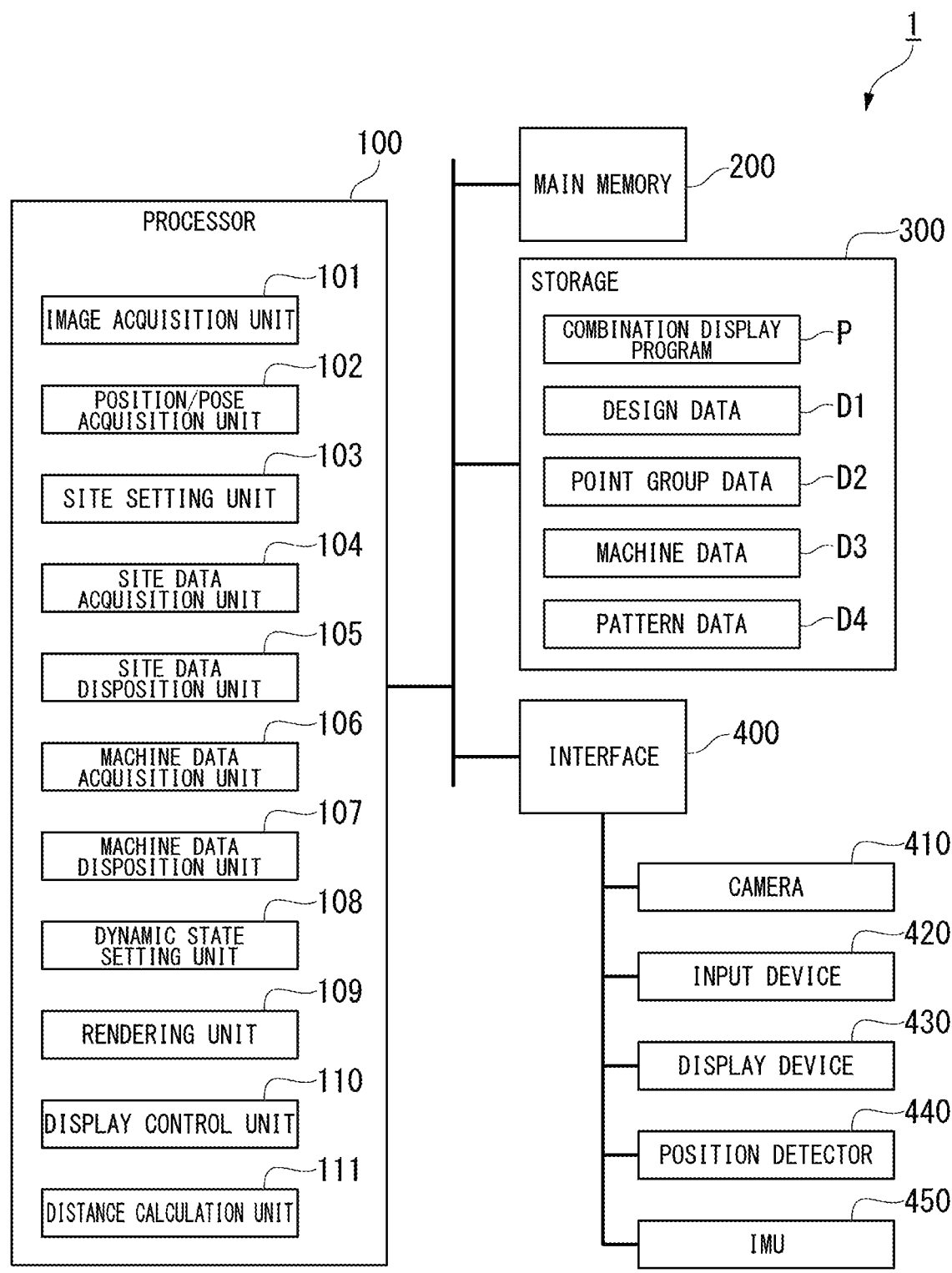
FIG. 1 is a schematic block diagram showing a configuration of a portable terminal according to a first embodiment.

FIG. 1 is a schematic block diagram showing a configuration of a portable terminal according to the first embodiment.

A portable terminal 1 has a computer, built thereinto, including a processor 100, a main memory 200, a storage 300, and an interface 400. The portable terminal 1 includes a camera 410, an input device 420, a display device 430, a position detector 440, and an inertial measuring unit (IMU) 450, which are connected to the computer via the interface 400. The portable terminal 1 is connected to a network via the interface 400. The computer is an example of a display control device.

The camera 410 is provided on a rear surface opposite to a surface on which the display device 430 is disposed in a casing of the portable terminal 1. The camera 410 includes a red green blue (RGB) camera and a depth camera, and generates a visible image and a distance image. The distance image is an image in which a value of each pixel indicates a distance between the camera 410 and an imaging target. The distance image may be obtained through time of flight (TOF) computation.

The input device 420 and the display device 430 are implemented by, for example, a touch panel. The position detector 440 receives a signal from a global navigation satellite system (GNSS), and detects a position of the portable terminal 1. The IMU 450 measures angular velocity, an azimuth, and an inclination of the portable terminal 1. The IMU 450 includes, for example, an acceleration sensor, an electronic compass, and a gyroscope. The position detector 440 and the IMU 450 are an example of a position/pose measurement unit which measures a position and a pose of a viewpoint in the real space.

The storage 300 stores a combination display program P, design data D1, point group data D2, machine data D3, and pattern data D4.

The combination display program P is data which is read from the storage 300 by the processor 100, and is developed on the main memory 200 so as to cause the processor 100 to execute a predetermined process.

The design data D1 is three-dimensional data representing a target shape of a construction site. The design data D1 is generated by, for example, computer-aided design (CAD), and is represented by a TIN surface. The design data D1 is site data which is three-dimensional data representing a shape of a construction site.

The point group data D2 is three-dimensional data representing the past shape of the construction site. The point group data D2 is obtained by performing stereo processing on, for example, a plurality of aerial images, or stereo images captured by a stereo camera. The point group data D2 is site data which is three-dimensional data representing a shape of the construction site.

The machine data D3 is three-dimensional data representing a shape of a work machine. A plurality of skeletons which are connected to each other via joints are set in the machine data D3. For example, respective skeletons of a lower traveling body, an upper slewing body, a boom, an arm, and a bucket are set in the machine data D3 presenting a hydraulic excavator, and thus the hydraulic excavator related to a plurality of poses can be reproduced by using the single piece of machine data D3.

The pattern data D4 stores an operation pattern for the skeletons in each piece of machine data D3. In other words, the processor 100 operates the skeletons in the machine data D3 according to the pattern data D4, and can thus apply motion for reproducing a predetermined action to the machine data D3.

Examples of the storage 300 may include a hard disk drive (HDD), a solid state drive (SSD), a magnetic disk, a magneto-optical disc, a compact disc read only memory (CD-ROM), a digital versatile disc read only memory (DVD-ROM), and a semiconductor memory. The storage 300 may be an internal medium which is directly connected to a bus of the portable terminal 1, and may be an external medium which is connected to the portable terminal 1 via the interface 400. The storage 300 is a non-transitory storage medium.

<<Software of Portable Terminal>>

The processor 100 includes an image acquisition unit 101, a position/pose acquisition unit 102, a site setting unit 103, a site data acquisition unit 104, a site data disposition unit 105, a machine data acquisition unit 106, a machine data disposition unit 107, a dynamic state setting unit 108, a rendering unit 109, a display control unit 110, and a distance calculation unit 111, according to execution of the combination display program P.

The image acquisition unit 101 acquires a visible image and a distance image captured by the camera 410.

The position/pose acquisition unit 102 acquires position data detected by the position detector 440, and angular velocity, an azimuth, and an inclination measured by the IMU 450. Hereinafter, angular velocity, an azimuth, and an inclination of the portable terminal 1 will be referred to as pose data of the portable terminal 1 in some cases.

The site setting unit 103 sets a shape of a construction site displayed on the display device 430 to any one of the current status shape, the past shape, and a target shape on the basis of a user's operation performed via the input device 420.

The site data acquisition unit 104 acquires site data to be disposed in a virtual space for rendering an image displayed on the display device 430. In a case where a shape displayed by the site setting unit 103 is set to the current status shape, the site data acquisition unit 104 generates site data (current status data) which is three-dimensional data representing the current status shape on the basis of the distance image acquired by the image acquisition unit 101 and the position data and the pose data acquired by the position/pose acquisition unit 102. For example, the site data acquisition unit 104 may generate a three-dimensional shape on the basis of the distance image, and may generate the current status data by mapping the three-dimensional shape onto the virtual space by using the position data and the pose data. In a case where a shape displayed by the site setting unit 103 is set to the past shape, the site data acquisition unit 104 reads the point group data D2 from the storage 300. In a case where a shape displayed by the site setting unit 103 is set to the target shape, the site data acquisition unit 104 reads the design data D1 from the storage 300.

The site data disposition unit 105 secures a storage region for a virtual space in the main memory 200. The site data disposition unit 105 disposes the site data in the virtual space. In this case, the site data disposition unit 105 disposes the site data such that a relative position and direction between a viewpoint in the virtual space and the site data correspond to a relative position and direction between a viewpoint of the camera 410 in the real space and the construction site.

The machine data acquisition unit 106 reads the machine data D3 to be disposed in the virtual space from the storage 300. Specifically, in a case where a user gives an instruction for disposing a work machine in the virtual space, the machine data acquisition unit 106 reads the machine data D3 related to a vehicle type set by the user from the storage 300.

The machine data disposition unit 107 disposes the machine data D3 in the virtual space. Specifically, the machine data disposition unit 107 disposes the machine data D3 at a point with the lowest height where a portion corresponding to a traveling body comes into contact with the site data in a vertical direction when the machine data D3 is lowered from the top in the vertical direction of the virtual space. The machine data disposition unit 107 determines a position and a pose of the machine data D3 according to a dynamic state set by the dynamic state setting unit 108.

The dynamic state setting unit 108 sets a dynamic state of a work machine represented by the machine data D3 on the basis of the user's operation performed via the input device 420. The dynamic state of the work machine includes traveling and slewing of the work machine, and driving of a work equipment. Dynamic states related to the slewing of the work machine and the driving of the work equipment are stored in the storage 300 as the pattern data D4. In a case where a dynamic state related to traveling is set, the dynamic state setting unit 108 receives input of a traveling route of the work machine via the input device 420. In a case where dynamic states related to slewing of the work machine and driving of the work equipment are set, the dynamic state setting unit 108 receives selection of the pattern data D4 via the input device 420.

The rendering unit 109 renders the machine data D3 disposed in the virtual space on the basis of a viewpoint in the virtual space. The term "render" indicates that a two-dimensional image is generated. The rendering unit 109 combines the rendered machine data D3 with the visible image acquired by the image acquisition unit 101 so as to generate a combined site image I1. In a case where a shape displayed by the site setting unit 103 is set to the past shape or the target shape, the rendering unit 109 renders the machine data D3 and the site data, and combines the visible image with the rendered machine data D3 and site data so as to generate the combined site image I1. The rendering unit 109 combines the combined site image I1 with an operation panel image I2 so as to generate a display image I.

The display control unit 110 outputs the image generated by the rendering unit 109 to the display device 430.

The distance calculation unit 111 receives input of two points in the virtual space via the input device 420, and calculates a distance between the two points.

<<Display Image>>

Figure 2:
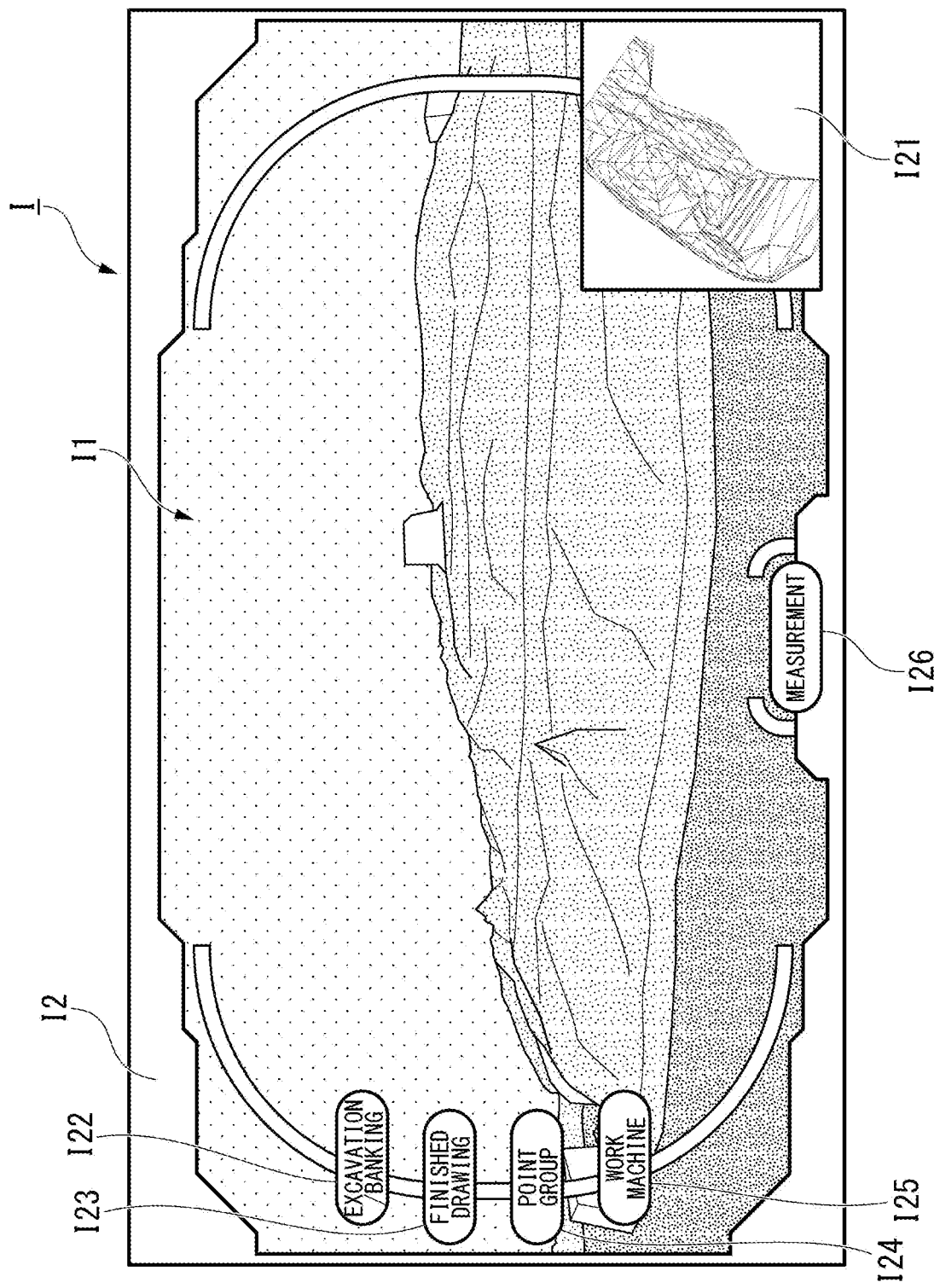
FIG. 2 is a diagram showing an example of a display image generated by a rendering unit.

FIG. 2 is a diagram showing an example of a display image generated by the rendering unit.

The rendering unit 109 combines the combined site image I1 with the operation panel image I2 so as to generate the display image I. The operation panel image I2 includes a map region I21, an excavation/banking button I22, a finished drawing button I23, a point group button I24, a work machine button I25, and a measurement button I26.

A top view of the construction site is displayed in the map region I21.

The excavation/banking button I22 switches between ON and OFF states when pressed. In a case where the excavation/banking button I22 is brought into an ON state, the site setting unit 103 sets a shape of the construction site displayed on the display device 430 to the target shape. In a case where the excavation/banking button I22 is in an ON state, a combination of the visible image and the design data D1 is displayed as the combined site image I1. In the design data D1 in this case, a location which is depressed more than a current status landform, that is, a location to be excavated, and a location which protrudes more than the current status landform, that is, a location to be banked are displayed in different aspects (for example, colors). Consequently, the user can visually recognize a location to be excavated and a location to be banked at the construction site.

The finished drawing button I23 switches between ON and OFF states when pressed. In a case where the finished drawing button I23 is brought into an ON state, the site setting unit 103 sets a shape of the construction site displayed on the display device 430 to the target shape. In a case where the finished drawing button I23 is in an ON state, a combination of the visible image and the design data D1 is displayed as the combined site image I1. The design data D1 in this case is displayed in an aspect without depending on a difference from the current status landform.

The point group button I24 switches between ON and OFF states when pressed. In a case where the point group button I24 is brought into an ON state, the site setting unit 103 sets a shape of the construction site displayed on the display device 430 as the past shape. In a case where the point group button I24 is in an ON state, a combination of the visible image and the point group data D2 is displayed as the combined site image I1.

The excavation/banking button I22, the finished drawing button I23, and the point group button I24 never become in an ON state at the same time. For example, in a case where the finished drawing button I23 is pressed in an ON state of the excavation/banking button I22, the finished drawing button I23 is slewed into an ON state, and the excavation/banking button I22 is also slewed into an OFF state. On the other hand, in a case where the excavation/banking button I22, the finished drawing button I23, and the point group button I24 are all in an OFF state, the site setting unit 103 sets a shape of the construction site displayed on the display device 430 as the current status shape. In this case, the site data is not combined with the combined site image I1, and the current status landform represented by the visible image is displayed in the combined site image I1.

Figure 3:
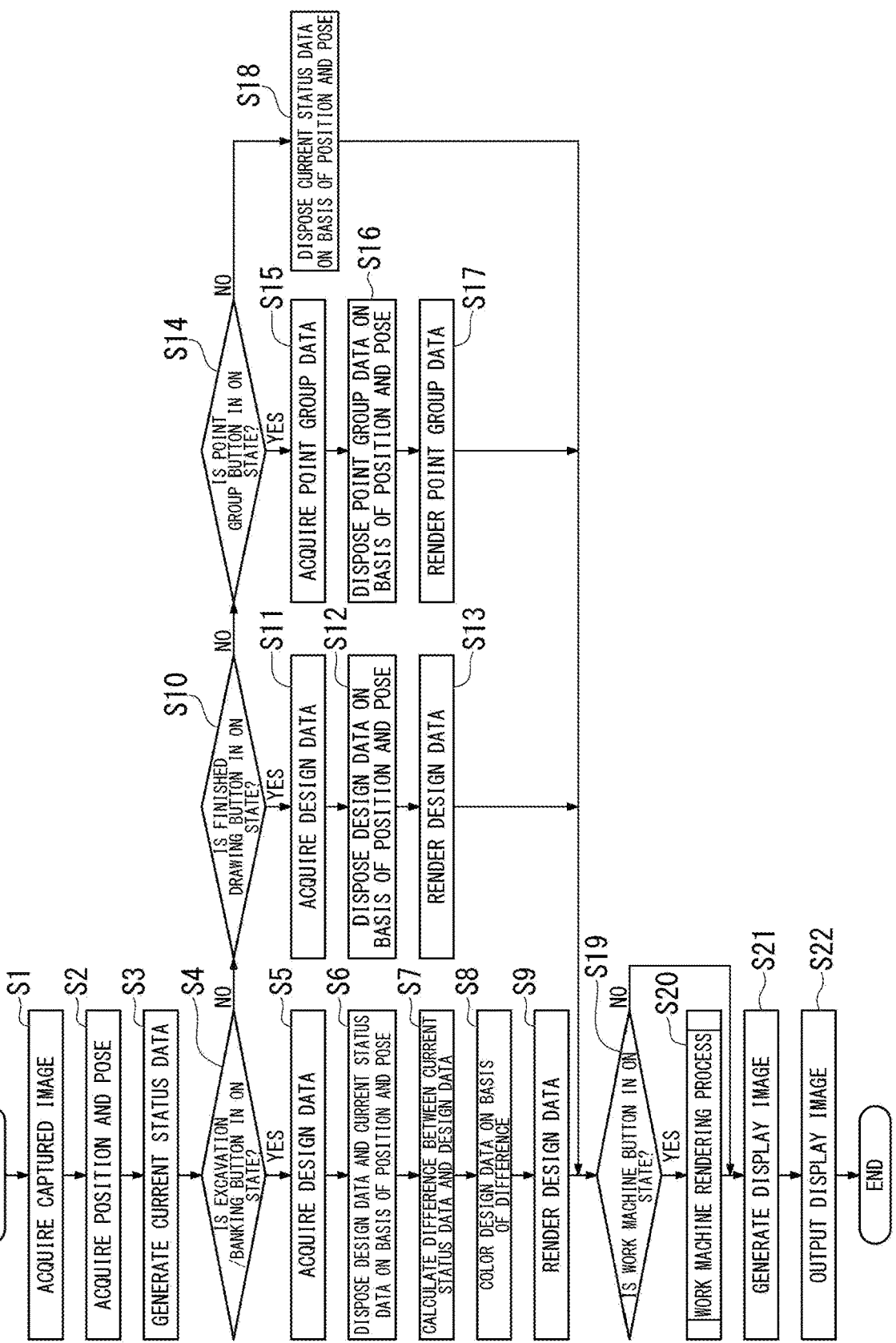
FIG. 3 is a flowchart showing a display control method for the portable terminal according to the first embodiment.

The work machine button I25 switches between ON and OFF states when pressed. The work machine button I25 switches between ON and OFF states independently from the excavation/banking button I22, the finished drawing button I23, and the point group button I24. In other words, the work machine button I25 does not switch between ON and OFF states due to pressing of the excavation/banking button I22, the finished drawing button I23, and the point group button I24. In a case where the work machine button I25 is in an ON state, the machine data D3 is included in the combined site image I1. On the other hand, in a case where the work machine button I25 is in an OFF state, as shown in FIG. 3, the machine data D3 is not included in the combined site image I1.

The measurement button I26 switches between ON and OFF states when pressed. In a case where the measurement button is in an ON state, two points on the combined site image I1 are selected, and thus a distance between the two points in the real space is displayed.

In addition, an ON or OFF state of each button is set by the site setting unit 103, and is stored in the main memory 200.

<<Display Control Method>>

FIG. 3 is a flowchart showing a display control method for the portable terminal according to the first embodiment.

In a case where a user operates the portable terminal 1, and thus executes the combination display program P, the portable terminal 1 repeatedly executes a display control process described below every timing related to a frame rate of the camera 410.

First, the image acquisition unit 101 acquires a visible image and a distance image captured from the camera 410 (step S1). The position/pose acquisition unit 102 acquires position data and pose data from the position detector 440 and the IMU 450 (step S2). Next, the site data acquisition unit 104 generates current status data representing the current status of a construction site on the basis of the acquired distance image, position data, and pose data (step S3). The site data acquisition unit 104 may generate the current status data by using a technique such as Tango.

Next, the site data disposition unit 105 refers to the main memory 200, and determines whether or not the excavation/ banking button I22 is in an ON state (step S4). In a case where the excavation/banking button I22 is in an ON state (step S4: YES), the site data acquisition unit 104 reads the design data D1 from the storage 300 (step S5). Next, the site data disposition unit 105 disposes the current status data and the design data D1 in a virtual space on the basis of the position data and the pose data acquired in step S2 (step S6). Next, the rendering unit 109 calculates differences from the current status data in the vertical direction with respect to a plurality of points on the design data D1 (step S7). In this case, in a case where the current status data is located upward of the design data D1 in the vertical direction, a difference has a positive number, and, in a case where the current status data is located downward of the design data D1 in the vertical direction, a difference has a negative number. Next, the rendering unit 109 colors the design data D1 on the basis of the differences (step S8). For example, the rendering unit 109 makes color tones different between a region in which the difference has a positive number and a region in which the difference has a negative number in the design data D1. Specifically, the rendering unit 109 colors a region in which there is no difference from the design data D1 green. The rendering unit 109 colors a region in which a difference has a positive number in a color close to green as an absolute value of the difference becomes smaller, and colors the region in a color close to red as the absolute value of the difference becomes greater. The rendering unit 109 colors a region in which a difference has a negative number in a color close to green as an absolute value of the difference becomes smaller, and colors the region in a color close to blue as the absolute value of the difference becomes greater. The rendering unit 109 renders the colored design data D1 (step S9).

In a case where the excavation/banking button I22 is in an OFF state (step S4: NO), the site data disposition unit 105 refers to the main memory 200, and determines whether or not the finished drawing button I23 is in an ON state (step S10). In a case where the finished drawing button I23 is in an ON state (step S10: YES), the site data acquisition unit 104 reads the design data D1 from the storage 300 (step S11). Next, the site data disposition unit 105 disposes the design data D1 in the virtual space on the basis of the position data and the pose data acquired in step S2 (step S12). The rendering unit 109 renders the design data D1 (step S13).

In a case where the finished drawing button I23 is in an OFF state (step S10: NO), the site data disposition unit 105 refers to the main memory 200, and determines whether or not the point group button I24 is in an ON state (step S14). In a case where the point group button I24 is in an ON state (step S14: YES), the site data acquisition unit 104 reads the point group data D2 from the storage 300 (step S15). Next, the site data disposition unit 105 disposes the point group data D2 in the virtual space on the basis of the position data and the pose data acquired in step S2 (step S16). The rendering unit 109 renders the point group data (step S17).

In a case where the excavation/banking button I22, the finished drawing button I23, and the point group button I24 are all in an OFF state (step S14: NO), the site data disposition unit 105 disposes the current status data generated in step S3 in the virtual space on the basis of the position data and the pose data acquired in step S2 (step S18). The rendering unit 109 does not render the current status data.

In a case where the site data is disposed in the virtual space, the machine data disposition unit 107 refers to the main memory 200, and determines whether or not the work machine button I25 is in an ON state (step S19). In a case where the work machine button I25 is in an ON state (step S19: YES), the portable terminal 1 executes a work machine rendering process (step S20).

Figure 4:
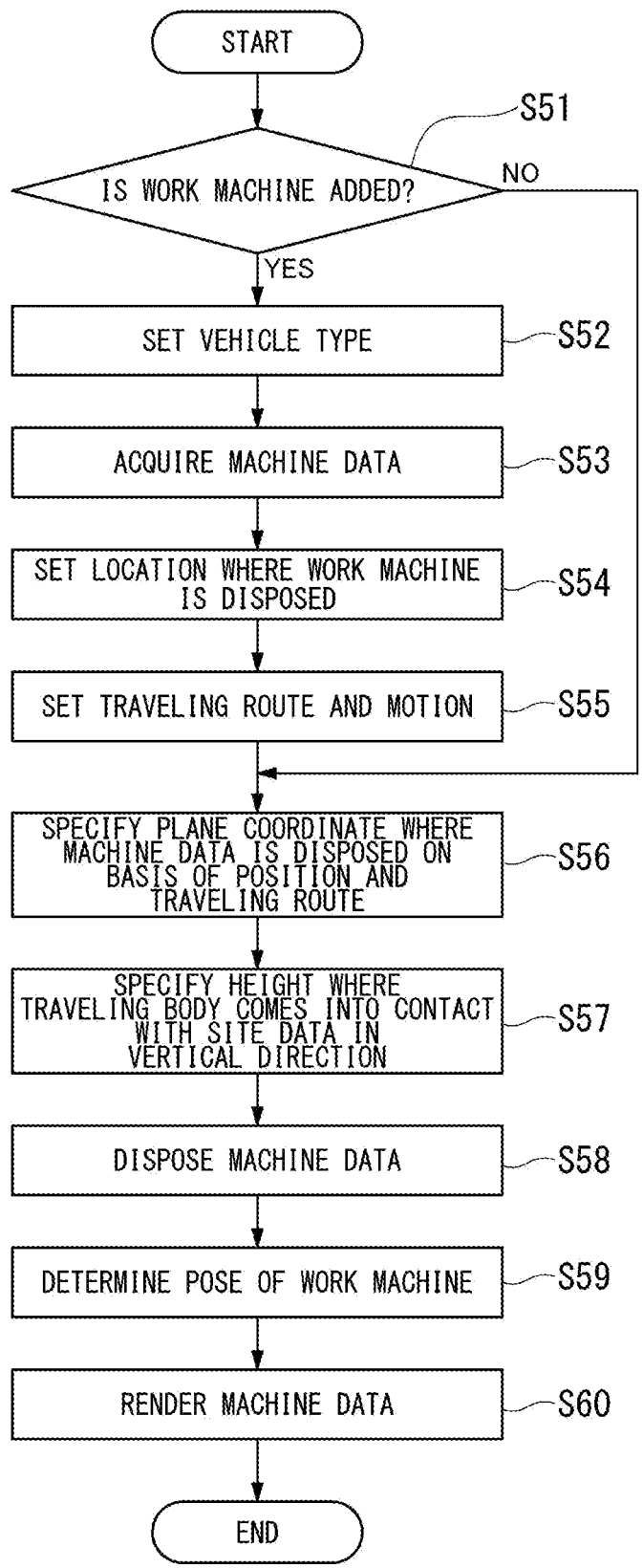
FIG. 4 is a flowchart showing a work machine rendering process according to the first embodiment.

FIG. 4 is a flowchart showing the work machine rendering process according to the first embodiment.

In a case where the portable terminal 1 starts the work machine rendering process, the machine data acquisition unit 106 determines whether or not the user gives an instruction for adding a work machine through an operation using the input device 420 (step S51). In a case where the work machine button I25 switches from an OFF state to an ON state for the first time, the machine data acquisition unit 106 regards that an instruction for adding a work machine is given.

In a case where an instruction for adding a work machine is given (step S51: YES), the machine data acquisition unit 106 displays selectable vehicle types of work machines on the display device 430, and allows the user to select any vehicle type such that a vehicle type is set (step S52). The machine data acquisition unit 106 reads the machine data D3 related to the set vehicle type from the storage 300 (step S53).

Figure 5:
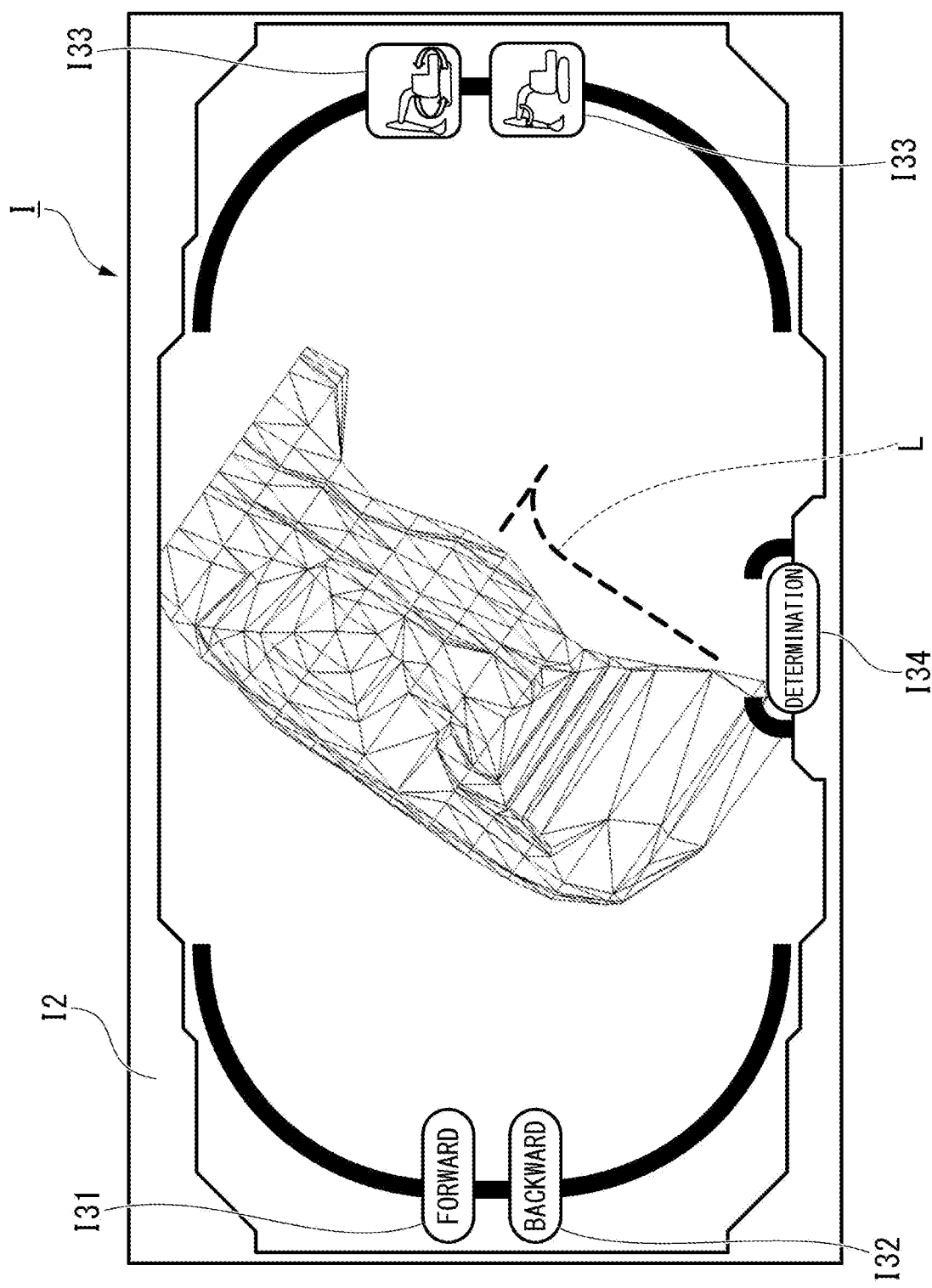
FIG. 5 is a diagram showing an example of an image displayed on a display device when a work machine is added.

FIG. 5 is a diagram showing an example of an image displayed on the display device when a work machine is added.

Next, as shown in FIG. 5, the machine data disposition unit 107 displays an enlarged top view of the construction site on the entire display device 430, and allows the user to select a location where the work machine is disposed (step S54). Next, the dynamic state setting unit 108 receives input of setting of a traveling route and motion of the work machine via the input device 420 (step S55). For example, the user may set a traveling route by rendering a line L through a drag-and-drop operation with the location selected in step S54 as a start point by using the input device 420 as shown in FIG. 5. In this case, the work machine can be made to switch between forward movement (normal traveling) and backward movement (backward traveling) by pressing a forward movement button I31 or a backward movement button I32 shown in FIG. 5.

The user may press one of a plurality of motion icons 133 shown in FIG. 5, so as to set the type of operation of the work machine. The motion icons 133 are prepared for each piece of pattern data D4 stored in the storage 300. The user establishes addition of the work machine by pressing a determination button I34 shown in FIG. 5.

In a case where addition of the work machine is established or there is no instruction for adding a work machine (step S51: NO), the machine data disposition unit 107 specifies a plane coordinate where the machine data D3 is disposed in the virtual space on the basis of the position and the set traveling route of the machine data D3 (step S56). Specifically, in a case where a new work machine is added through the step S52 to step S55, the machine data disposition unit 107 specifies a plane coordinate on the virtual space corresponding to the disposition position set in step S54. On the other hand, in a case where a work machine is already disposed in the virtual space, a plane coordinate moved along the set traveling route by a predetermined distance (a distance by which the work machine advances for a time related to frame rates) from a plane coordinate on the virtual space where the work machine is already disposed is specified. In this case, the machine data disposition unit 107 specifies an inner wheel difference during curve traveling on the basis of a catalog value or the like related to the vehicle type set in step S52. The machine data disposition unit 107 determines a tangential line (tangential vector) to the line L representing the traveling route set in step S55 as a direction of the machine data D3.

Next, the machine data disposition unit 107 lowers the machine data D3 onto the plane coordinate in the virtual space from the top in the vertical direction, and specifies the lowest height where a portion corresponding to a traveling body of the machine data D3 comes into contact with the site data in the vertical direction (step S57). The machine data disposition unit 107 disposes the machine data D3 at a point with the specified height at the specified plane coordinate in the virtual space (step S58). In other words, the machine data disposition unit 107 disposes the machine data D3 on the site data according to gravity. The position specified in step S57 is a position where the portion corresponding to the traveling body of the machine data D3 does not interfere with the site data, and thus does not hinder interference of portions other than the traveling body with the site data. For example, in a case where the machine data D3 is disposed at a position corresponding to a building of the site data, even though a work equipment interferes with a part of the building due to the machine data D3 being disposed inside the building, a height corresponding to a rooftop of the building is not specified, but a height corresponding to a floor of the building is specified. In another embodiment, the machine data disposition unit 107 may dispose the machine data D3 at a corresponding position corresponding in the site data, and may not necessarily dispose the machine data D3 to come into contact with the site data in the vertical direction. For example, the machine data disposition unit 107 according to another embodiment may dispose the machine data D3 to come into contact with the site data in the vertical direction in initial disposition of the machine data D3, and then may dispose the machine data D3 at a position with the same height changing a plane coordinate. In another embodiment, the site data may minutely interfere with the machine data D3 in the vertical direction, and a minute gap may be present between the site data and the machine data D3.

Next, the machine data disposition unit 107 reads the pattern data D4 related to the set motion from the storage 300, and determines a pose of the work machine according to the pattern data D4 (step S59). The rendering unit 109 renders the machine data D3 (step S60). In this case, the rendering unit 109 may color a portion of the machine data D3 interfering with the site data in a predetermined color. The rendering unit 109 may color a portion of the site data interfering with the machine data D3 in a predetermined color.

Referring to FIG. 3, in a case where the work machine rendering process in step S20 is finished, and the work machine button I25 is in an OFF state (step S19: NO), the rendering unit 109 combines the visible image acquired in step S1 with the rendered site data or machine data D3 so as to generate the combined site image I1.

Specifically, in a case where the excavation/banking button I22 is in an ON state, and the work machine button I25 is in an ON state, the rendering unit 109 combines the visible image with the design data D1 and the machine data D3 so as to generate the combined site image I1. In a case where the excavation/banking button I22 is in an ON state, and the work machine button I25 is in an OFF state, the rendering unit 109 combines the visible image with the design data D1 so as to generate the combined site image I1. In a case where the finished drawing button I23 is in an ON state, and the work machine button I25 is in an ON state, the rendering unit 109 combines the visible image with the design data D1 and the machine data D3 so as to generate the combined site image I1. In a case where the finished drawing button I23 is in an ON state, and the work machine button I25 is in an OFF state, the rendering unit 109 combines the visible image with the design data D1 so as to generate the combined site image I1. In a case where the point group button I24 is in an ON state, and the work machine button I25 is in an ON state, the rendering unit 109 combines the visible image with the point group data D2 and the machine data D3 so as to generate the combined site image I1. In a case where the point group button I24 is in an ON state, and the work machine button I25 is in an OFF state, the rendering unit 109 combines the visible image with the point group data D2 so as to generate the combined site image I1. In a case where the excavation/banking button I22, the finished drawing button I23, and the point group button I24 are all in an OFF state, and the work machine button I25 is in an ON state, the rendering unit 109 combines the visible image with the machine data D3 so as to generate the combined site image I1. In a case where the excavation/banking button I22, the finished drawing button I23, and the point group button I24 are all in an OFF state, and the work machine button I25 is in an OFF state, the rendering unit 109 uses the visible image as the combined site image I1 without combination.

The rendering unit 109 combines the generated combined site image I1 with the operation panel image I2 so as to generate the display image I (step S21). The display control unit 110 outputs the generated display image I to the display device 430 (step S22).

Through the processes, the current status shape, the past shape, and the target shape of the construction site are displayed in real time on the display device 430 of the portable terminal 1 in tracking of poses of the portable terminal 1 every timing related to a frame rate of the camera 410. In a case where the work machine button I25 remains pressed, the work machine moved in the construction site is displayed in real time on the display device 430. In other words, a position or a pose of the work machine displayed on the display device 430 temporally changes.

Figure 6:
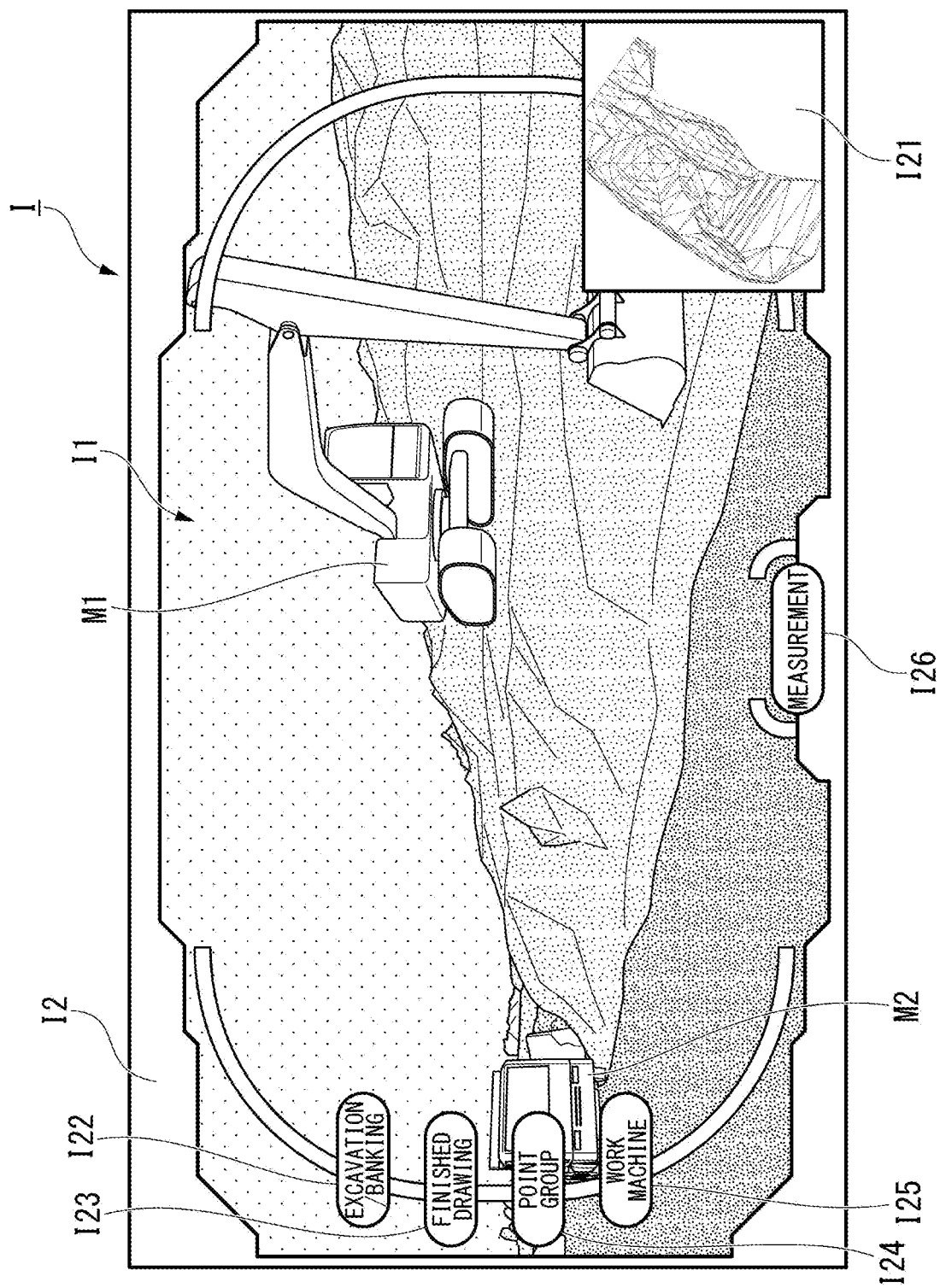
FIG. 6 is a diagram showing an example of a display image displayed on the display device at a first timing.
Figure 7:
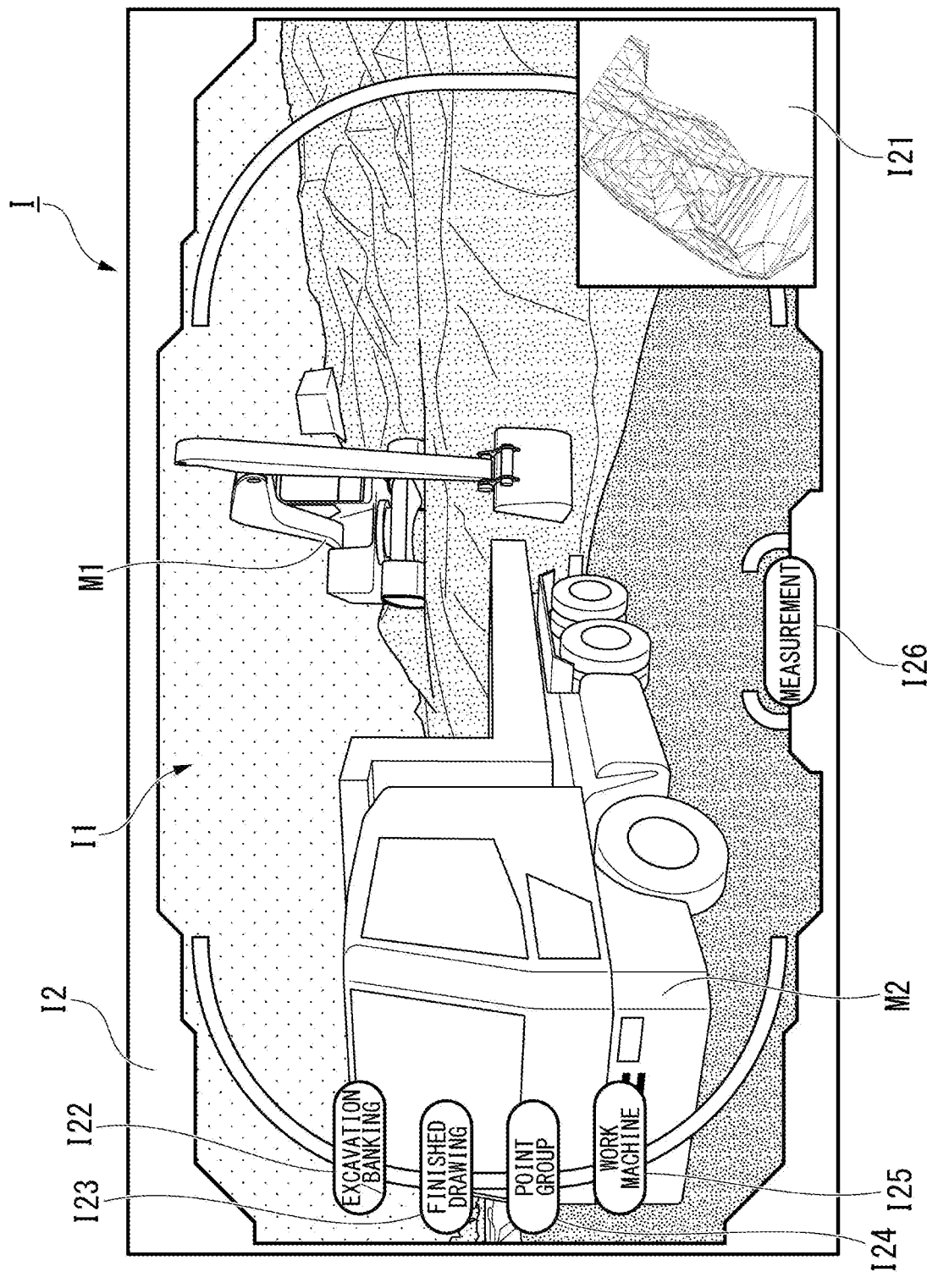
FIG. 7 is a diagram showing a first example of a display image displayed on the display device at a second timing.
Figure 8:
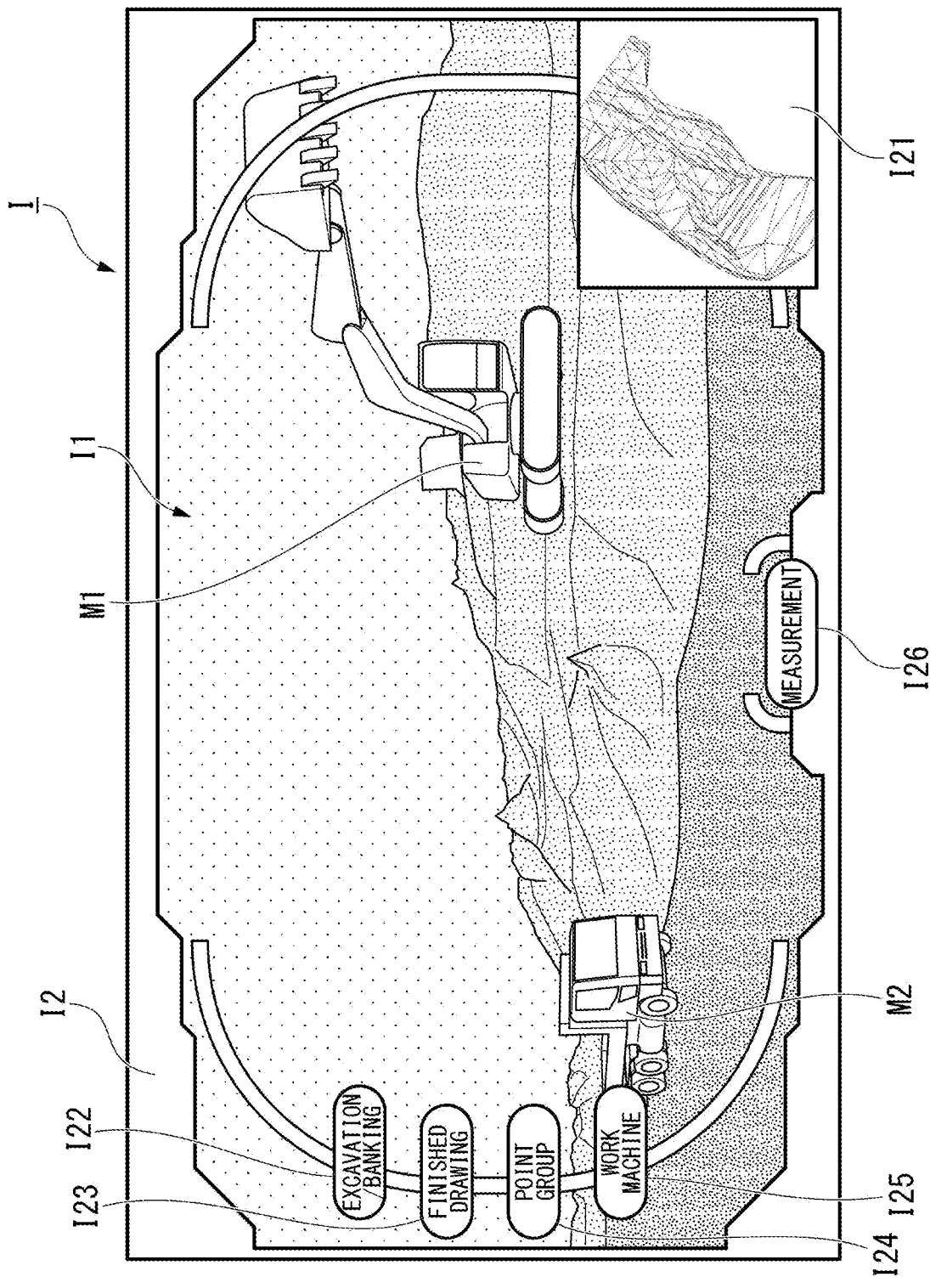
FIG. 8 is a diagram showing a second example of a display image displayed on the display device at the second timing.

FIG. 6 is a diagram showing an example of a display image displayed on the display device at a first timing. FIG. 7 is a diagram showing a first example of a display image displayed on the display device at a second timing. FIG. 8 is a diagram showing a second example of a display image displayed on the display device at the second timing.

In a case where the work machine button I25 is pressed, and thus the machine data D3 representing a hydraulic excavator and the machine data D3 representing a dump truck are disposed in a virtual space, an image in which a hydraulic excavator M1 and a dump truck M2 are disposed in a construction site is displayed on the display device 430 at the first timing as shown in FIG. 6.

Here, in a case where the user sets a traveling route of the machine data D3 representing the dump truck M2 in step S54, the display image I in which a position of the dump truck M2 is changed is displayed on the display device 430 at the second timing which is a timing later than the first timing as shown in FIG. 7. Consequently, the user can check a width of the traveling route of the dump truck M2 or the number of iron plates to be placed on the construction site at the construction site.

On the other hand, in a case where the user sets motion of the machine data D3 representing the hydraulic excavator M1 in step S54, the display image I in which a pose of the hydraulic excavator M1 is changed is displayed on the display device 430 at the second timing which is a timing later than the first timing as shown in FIG. 8. Consequently, the user can check the presence or absence of a space in which the hydraulic excavator M1 is operable at the construction site.

<<Measurement Process>>

In a case where the measurement button I26 is pressed in the display image I shown in FIG. 2 or the like, the distance calculation unit 111 executes a measurement process of displaying a distance between two points in a virtual space.

Figure 9:
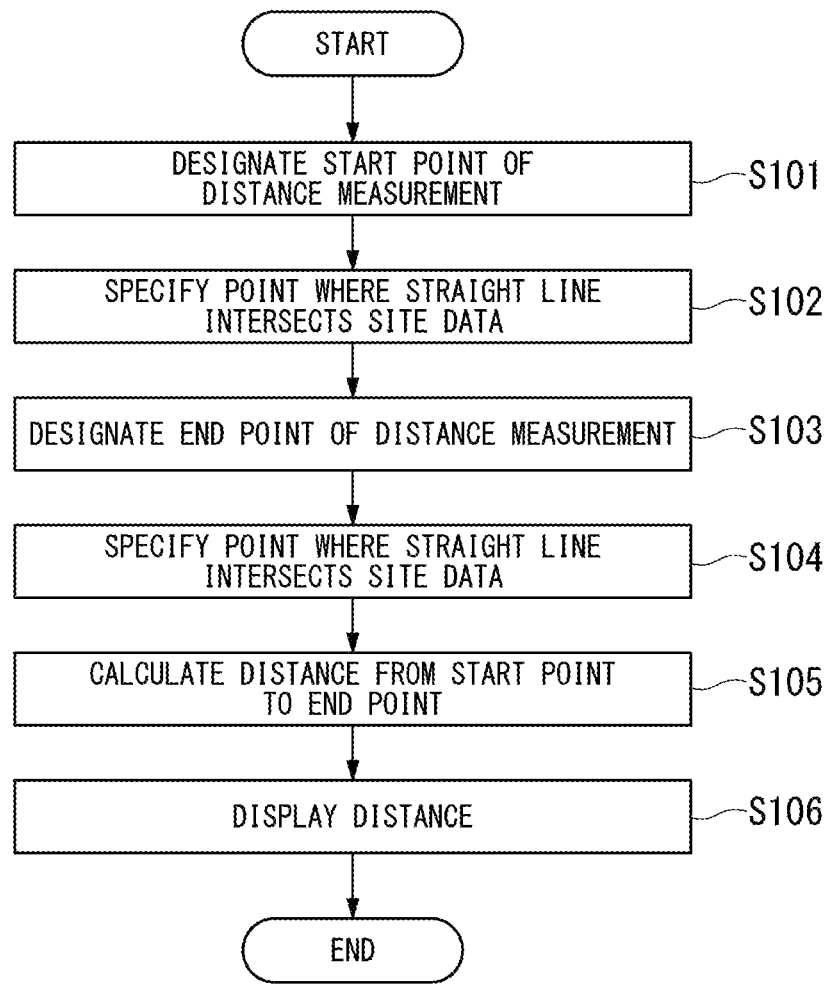
FIG. 9 is a flowchart showing a measurement process according to the first embodiment.

FIG. 9 is a flowchart showing a measurement process according to the first embodiment.

In a case where the measurement button I26 is pressed, the distance calculation unit 111 receives designation of a coordinate on the display image I as a start point of distance measurement via the input device 420 (step S101). For example, the user designates a coordinate by clicking or tapping a single point on the display image I. The distance calculation unit 111 disposes a straight line corresponding to the designated start point on the virtual space, and specifies a point where the straight line intersects site data (step S102). In a case where the machine data D3 is disposed at the designated coordinate, the distance calculation unit 111 specifies a point where the straight line intersects the machine data D3.

The distance calculation unit 111 receives designation of a coordinate on the display image I as an end point of distance measurement via the input device 420 (step S103). The distance calculation unit 111 disposes a straight line corresponding to the designated end point on the virtual space, and specifies a point where the straight line intersects the site data (step S104). In a case where the machine data D3 is disposed at the designated coordinate, the distance calculation unit 111 specifies a point where the straight line intersects the machine data D3.

The distance calculation unit 111 calculates a distance connecting the specified start point and end point to each other (step S105). In other words, the distance calculation unit 111 multiplies a length in the virtual space between the two points specified in step S102 and step S104 by a predetermined gain, and thus calculates a length in the real space. The rendering unit 109 renders a straight line connecting the two points specified in step S102 and step S104 to each other, and combines the straight line and the distance calculated in step S105 on the display image I (step S106). Consequently, the distance between the designated two points is displayed on the display device 430.

Thus, the user can easily measure a length in a construction site while viewing the portable terminal 1. For example, the user can measure a distance from a side surface of a work machine displayed on the combined site image I1 to a wall surface of a traveling route in the construction site.

Advantageous Effects

As mentioned above, the portable terminal 1 according to the first embodiment acquires a position and a pose of a viewpoint in a real space, disposes site data in a virtual space on the basis of the position and the pose, and disposes the machine data D3 in the virtual space to be brought into contact with the site data in the vertical direction. Consequently, the portable terminal 1 can virtually dispose and display a work machine in a construction site. Therefore, a user of the portable terminal 1 can easily check an operation of the work machine at the construction site. The term "acquire" indicates that a value used for processing is obtained. For example, the term "acquire" includes receiving a value, measuring a value, receiving input of a value, reading a value from a table, and calculating a value.

The portable terminal 1 according to the first embodiment renders the machine data D3 by temporally changing a position or a pose thereof. Consequently, a user of the portable terminal 1 can check a dynamic state of a work machine at a construction site in real time. The portable terminal 1 according to the first embodiment sets a dynamic state of the machine data D3, and renders the machine data by changing a position or a pose of the machine data with time according to the set dynamic state. Consequently, the user can check a dynamic state of a work machine through simple setting.

Other Embodiments

As mentioned above, one means has been described with reference to the drawings, but a specific configuration is not limited to the above-described configurations, and various design changes may occur.

Figure 10:
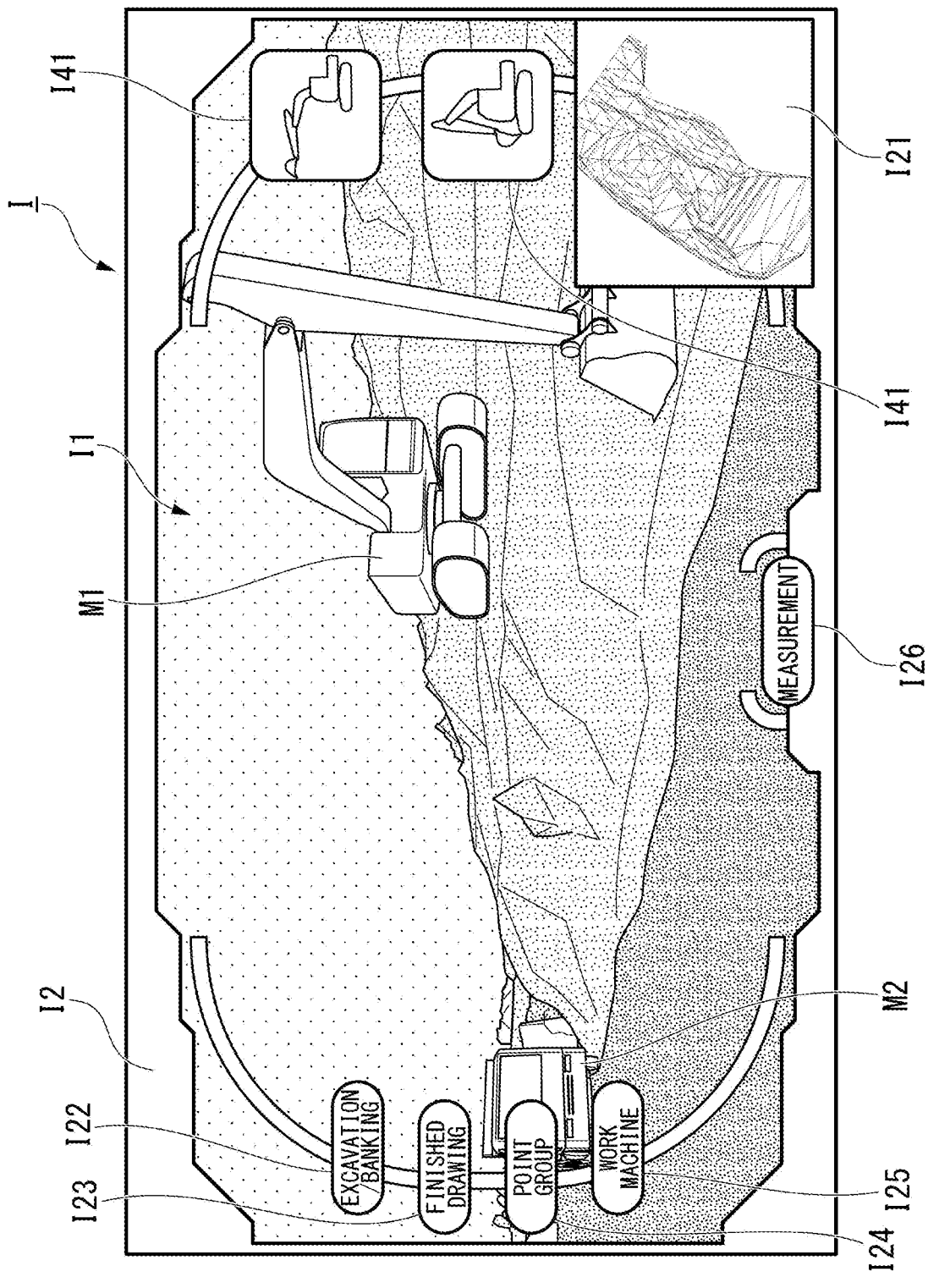
FIG. 10 is a diagram showing an example of a display image according to other embodiments.

FIG. 10 is a diagram showing an example of a display image according to other embodiments.

For example, the portable terminal 1 according to the first embodiment renders the machine data D3 by changing a position or a pose thereof with time, but is not limited thereto. For example, the portable terminal 1 according to other embodiments may store a plurality of poses of the machine data D3 in advance, render one of the poses, and change a rendered pose in a case where a pose switching button I41 shown in FIG. 10 is pressed.

The portable terminal 1 according to the first embodiment pulls the line L on the screen shown in FIG. 5 so as to determine a traveling route of a work machine, but is not limited thereto. For example, in a case where an instruction for starting recording of a traveling route is received via the input device 420, the dynamic state setting unit 108 according to other embodiments accumulates position data and pose data acquired by the position/pose acquisition unit 102 in the main memory 200. In a case where an instruction for finishing recording of a traveling route is received via the input device 420, the dynamic state setting unit 108 may set a time series of the position data and the pose data recorded in the main memory 200 as a traveling route. The portable terminal 1 according to other embodiments may display a controller image (for example, an image corresponding to a work equipment operation lever) for a work machine on the display device 430, and may change a position and a pose of the machine data D3 according to an operation on the controller image.

Skeletons are set in the machine data D3 according to the first embodiment, and the portable terminal 1 changes angles of the skeletons so as to change a pose of the machine data D3, but is not limited thereto. For example, regarding the machine data D3 according to other embodiments, the machine data D3 may be configured with three-dimensional data not having a movable portion, and the portable terminal 1 may simulate only traveling of a work machine.

In the first embodiment, the portable terminal 1 such as a smart phone or a tablet terminal displays a display image, but is not limited thereto. For example, in other embodiments, a projection type head mounted display (HMD) or a transmission type HMD may display a display image. In a case where the HMD displays a display image, the position/pose acquisition unit 102 may acquire a position and a pose of a user instead of a position and a pose of a viewpoint of a camera. In a case where the transmission type HMD displays a display image, a visible image may not be included in the display image. In this case, the transmission type HMD displays only the machine data D3, and thus the machine data D3 is displayed to overlap a construction site visually recognized with the eyes of a user.

Figure 11:
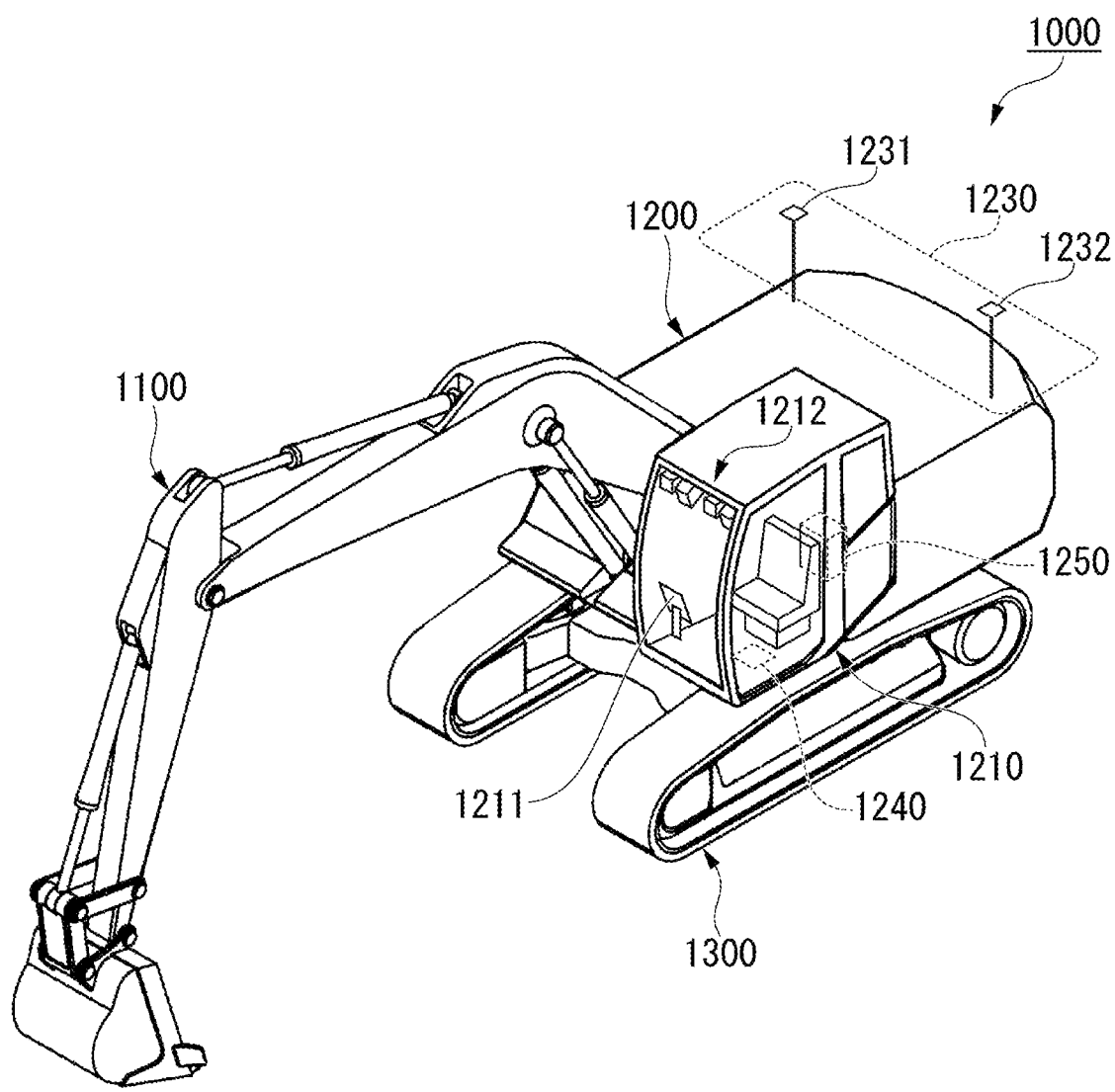
FIG. 11 is a perspective view showing an exterior of a hydraulic excavator according to other embodiments.

FIG. 11 is a perspective view showing an example of a hydraulic excavator including a display control device according to other embodiments.

In other embodiments, a display control device may be provided in a hydraulic excavator as shown in FIG. 11.

A hydraulic excavator 1000 includes a work equipment 1100, a slewing body 1200 supporting the work equipment 1100, and a traveling body 1300 supporting the slewing body 1200. The slewing body 1200 is provided with a cab 1210 for an operator to get in. A display device 1211 is provided inside the cab 1210. A stereo camera 1212 is provided on an upper part of the cab 1210. The stereo camera 1212 images the front of the cab 1210 through a windshield of a front surface of the cab 1210. The stereo camera 1212 includes at least one pair of cameras. A distance between the stereo camera 1212 and an imaging target may be calculated by using a pair of images captured by at least one pair of cameras of the stereo camera 1212.

The hydraulic excavator 1000 includes a position/azimuth calculator 1230, an inclination detector 1240, and a display control device 1250. The position/azimuth calculator 1230 calculates a position of the slewing body 1200 and an azimuth in which the slewing body 1200 is directed. The position/azimuth calculator 1230 calculates the azimuth of the slewing body 1200 by using a positioning signal received by a first receiver 1231 and a positioning signal received by a second receiver 1232. The inclination detector 1240 measures acceleration and angular velocity of the slewing body 1200, and detects an inclination of the slewing body 1200 on the basis of measurement results. The inclination detector 1240 is provided on, for example, a lower surface of the cab 1210. As the inclination detector 1240, for example, an IMU may be used.

The display control device 1250 acquires current status data on the basis of the images captured by the stereo camera 1212. In this case, the display control device 1250 acquires position data and pose data of the stereo camera 1212 on the basis of information obtained from the position/azimuth calculator 1230 and the inclination detector 1240. Consequently, the display control device 1250 generates a display image, and displays the display image on the display device 1211.

In other embodiments, a display control device may be a computer not including the camera 410, and may receive a visible image and a distance image in a wired or wireless manner from the portable camera 410. In other embodiments, the display device and the display control device may be configured separately from each other. For example, in a case where a display system includes a server which is the display control device and the portable terminal 1, the following process may be performed. The portable terminal 1 transmits an image captured by the camera 410, position data detected by the position detector 440, and pose data detected by the IMU 450 to the server via a communication line. The server generates a display image on the basis of the received data through the above-described processes. The server transmits the generated display image to the portable terminal 1. The display device 430 of the portable terminal 1 displays the received display image.

The portable terminal 1 according to the first embodiment acquires current status data from a distance image, but is not limited thereto. For example, in the portable terminal 1 according to other embodiments may handle recently measured point group data D2 as current status data.

The portable terminal 1 according to the first embodiment renders the machine data D3 on an image in which a construction site is captured, but is not limited thereto. For example, the portable terminal 1 according to other embodiments may image a scale model reproducing a construction site with the camera 410, and may render the machine data D3 on an image in which the scale model is captured. In a case where a marker (for example, a two-dimensional code) is attached to a position corresponding to a reference point in the scale model, the site data disposition unit 105 disposes site data such that the position corresponding to the reference point is aligned with a position of the marker.

The scale model is a model reproducing a shape of the construction site by changing a scale. Therefore, current status data generated by using an image in which the scale model is captured is three-dimensional data representing a shape of the construction site. The portable terminal 1 changes a size of the machine data D3 on the basis of a scale of the scale model. The scale of the scale model may be designated by a user, may be specified through comparison between current status data and design data of the construction site, and may be obtained by reading a value described in the scale model. In this case, the distance calculation unit 111 may multiply the distance calculated in step S105 by an inverse number of the scale of the scale model, so as to calculate a distance in the construction site. In a case where there is a scale model reproducing a work machine at the same scale as that of the scale model of the construction site, a user may measure a distance between the scale model of the construction site and the scale model of the work machine by using the portable terminal 1. In this case, the portable terminal 1 may not necessarily render the machine data.

In the portable terminal 1 according to the first embodiment, a description has been made of a case where the combination display program P is stored in the storage 300, but this is only an example. For example, in other embodiments, the combination display program P may be delivered to the portable terminal 1 via a communication line. In this case, the portable terminal 1 develops the delivered combination display program P to the main memory 200, and executes the processes.

The combination display program P may realize some of the above-described functions. For example, the combination display program P may realize the above-described functions through a combination with another combination display program P already stored in the storage 300 or a combination with another combination display program P installed in another device.

The portable terminal 1 may include a programmable logic device (PLD) in addition to the configuration or instead of the configuration. Examples of the PLD may include a programmable array logic (PAL), a generic array logic (GAL), a complex programmable logic device (CPLD), and a field programmable gate array (FPGA). In this case, some of the functions realized by the processor 100 may be realized by the PLD.

INDUSTRIAL APPLICABILITY

The display control device enables a user to easily check an action of a work machine at a construction site.

REFERENCE SIGNS LIST

1: PORTABLE TERMINAL
100: PROCESSOR

200: MAIN MEMORY
300: STORAGE
400: INTERFACE
410: CAMERA
420: INPUT DEVICE
430: DISPLAY DEVICE
440: POSITION DETECTOR
450: IMU
101: IMAGE ACQUISITION UNIT
102: POSITION/POSE ACQUISITION UNIT
103: SITE SETTING UNIT
104: SITE DATA ACQUISITION UNIT
105: SITE DATA DISPOSITION UNIT
106: MACHINE DATA ACQUISITION UNIT
107: MACHINE DATA DISPOSITION UNIT
108: DYNAMIC STATE SETTING UNIT
109: RENDERING UNIT
110: DISPLAY CONTROL UNIT
111: DISTANCE CALCULATION UNIT
I: DISPLAY IMAGE
I1: COMBINED SITE IMAGE
I2: OPERATION PANEL IMAGE
I21: MAP REGION
I22: EXCAVATION/BANKING BUTTON
I23: FINISHED DRAWING BUTTON
I24: POINT GROUP BUTTON
I25: WORK MACHINE BUTTON
I26: MEASUREMENT BUTTON

The invention claimed is:

1. A display control device comprising:
a position/pose acquisition unit configured to acquire a position and a pose of a first viewpoint in a real space according to a position and a pose of a portable terminal comprising a display device;
a site data disposition unit configured to dispose site data which is three-dimensional data representing a shape of a construction site in a virtual space on the basis of the position and the pose of the first viewpoint;
a machine data disposition unit configured to dispose machine data which is three-dimensional data representing a shape of a work machine at a position corresponding to the site data in the virtual space;
a rendering unit configured to render the disposed machine data according to a second viewpoint in the virtual space; and
a display control unit configured to output the rendered disposed machine data to the display device,
wherein the site data disposition unit disposes the site data such that a relative position and direction between the second viewpoint and the disposed site data correspond to a relative position and direction between the first viewpoint and the construction site.

2. The display control device according to claim 1, wherein the rendering unit renders the disposed machine data by changing a position or a pose of the machine data with time.

3. The display control device according to claim 2, further comprising:
a dynamic state setting unit that sets a dynamic state of the machine data,
wherein the rendering unit renders the disposed machine data by changing the position or the pose of the machine data with time according to the dynamic state set by the dynamic state setting unit.

4. The display control device according to claim 3,
wherein the machine data has a movable portion, and
wherein the rendering unit renders the disposed machine data by changing a pose of the movable portion of the disposed machine data.

5. The display control device according to claim 2,
wherein the machine data has a movable portion, and
wherein the rendering unit renders the disposed machine data by changing a pose of the movable portion of the disposed machine data.

6. The display control device according to claim 2, further comprising:
an image acquisition unit that acquires an image captured by an imaging device of the portable terminal,
wherein the position/pose acquisition unit acquires a position and a pose of the first viewpoint which is a viewpoint of the imaging device.

7. The display control device according to claim 6,
wherein the rendering unit combines the rendered disposed machine data with the image.

8. The display control device according to claim 2,
wherein the position/pose acquisition unit acquires a position and a pose of the display control device.

9. The display control device according to claim 2,
wherein the position/pose acquisition unit acquires a position and a pose of an HMD which displays the rendered disposed machine data.

10. The display control device according to claim 1,
wherein the rendering unit renders one of a plurality of positions or a plurality of poses of the disposed machine data.

11. The display control device according to claim 1,
wherein the machine data has a movable portion, and
wherein the rendering unit renders the disposed machine data by changing a pose of the movable portion of the disposed machine data.

12. The display control device according to claim 1, further comprising:
an image acquisition unit that acquires an image captured by an imaging device of the portable terminal,
wherein the position/pose acquisition unit acquires a position and a pose of the first viewpoint which is a viewpoint of the imaging device.

13. The display control device according to claim 12,
wherein the rendering unit combines the rendered disposed machine data with the image.

14. The display control device according to claim 13, further comprising:
a site data acquisition unit that acquires the site data on the basis of the image.

15. The display control device according to claim 12, further comprising:
a site data acquisition unit that acquires the site data on the basis of the image.

16. The display control device according to claim 1,
wherein the position/pose acquisition unit acquires a position and a pose of the display control device.

17. The display control device according to claim 1,
wherein the position/pose acquisition unit acquires a position and a pose of an HMD which displays the rendered disposed machine data.

18. The display control device according to claim 1 further comprising:
a distance calculation unit configured to measure a distance in real space between two points in the virtual space by performing steps of:
receiving a designation of coordinate on the display image as a start point of distance measurement;

disposing a straight line corresponding to the designated start point on the virtual space;

specifying a point where a straight line intersects the site data;

receiving a designation of a coordinate on the display image as an end point of distance measurement;

disposing a straight line corresponding to the designated end point on the virtual space;

specifying a point where the straight line intersects the site data;

calculating a distance connecting the specified start point and end point to each other, by multiplying a length in the virtual space between the two points specified by a predetermined gain, as a calculated length in the real space, and rendering a straight line connecting the two points representing the measurement in real space.

19. A display control method comprising the steps of:

acquiring a position and a pose of a first viewpoint in a real space according to a position and a pose of a portable terminal comprising a display device;

disposing site data which is three-dimensional data representing a shape of a construction site in a virtual space on the basis of the position and the pose of the first viewpoint;

disposing machine data which is three-dimensional data representing a shape of a work machine at a position corresponding to the site data in the virtual space;

rendering the disposed machine data according to a second viewpoint in the virtual space; and outputting the rendered disposed machine data to the display device, wherein the site data disposition unit disposes the site data such that a relative position and direction between the second viewpoint and the disposed site data correspond to a relative position and direction between the first viewpoint and the construction site.

20. A program causing a computer to execute the steps of:

acquiring a position and a pose of a first viewpoint in a real space according to a position and a pose of a portable terminal comprising a display device;

disposing site data which is three-dimensional data representing a shape of a construction site in a virtual space on the basis of the position and the pose of the first viewpoint;

disposing machine data which is three-dimensional data representing a shape of a work machine at a position corresponding to the site data in the virtual space;

rendering the disposed machine data according to a second viewpoint in the virtual space; and outputting the rendered disposed machine data to the display device, wherein the site data disposition unit disposes the site data such that a relative position and direction between the second viewpoint and the disposed site data correspond to a relative position and direction between the first viewpoint and the construction site.

21. A display system comprising:

a position/pose measurement unit configured to measure a position and a pose of a first viewpoint in a real space according to a position and a pose of a portable terminal;

a site data disposition unit configured to dispose site data which is three-dimensional data representing a shape of a construction site in a virtual space on the basis of the position and the pose of the first viewpoint;

a machine data disposition unit configured to dispose machine data which is three-dimensional data representing a shape of a work machine at a position corresponding to the site data in the virtual space;

a rendering unit configured to render the disposed machine data according to a second viewpoint in the virtual space; and a display unit configured to display the rendered disposed machine data wherein the display unit is provided on the portable terminal, wherein the site data disposition unit disposes the site data such that a relative position and direction between the second viewpoint and the disposed site data correspond to a relative position and direction between the first viewpoint and the construction site.

* * * * *